UNITED STATES PATENT OFFICE.

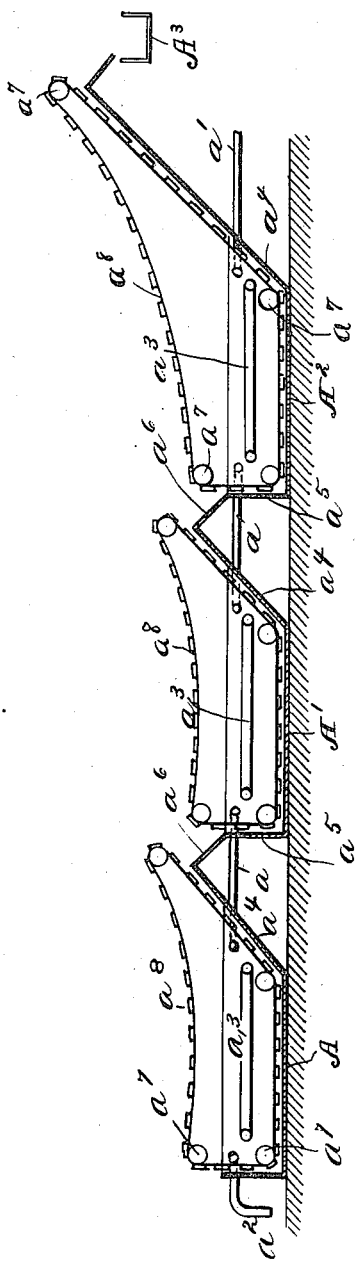

HERBERT H. DOW, OF MIDLAND, MICHIGAN, ASSIGNOR TO THE DOW CHEMICAL COMPANY, OF MIDLAND, MICHIGAN, A CORPORATION OF MICHIGAN.

METHOD OF PRODUCING CRYSTALS.

1,004,858.

Specification of Letters Patent.

Patented Oct. 3, 1911.

Application filed November 11, 1907. Serial No. 401,580.

*To all whom it may concern:*

Be it known that I, HERBERT H. DOW, a citizen of the United States, resident of Midland, county of Midland, and State of Michigan, have invented a new and useful Improvement in Methods of Producing Crystals, of which the following is a specification, the principle of the invention being herein explained and the best mode in which I have contemplated applying that principle, so as to distinguish it from other inventions.

My present invention relates to the manufacture of chemical products of a crystalline nature and finds a convenient exemplification in the manufacture of common salt (NaCl). It is not intended, however, by thus describing such process in the particular connection named to imply a limitation thereof to any restricted field, for as will be obvious crystals of many salts may be advantageously formed by the employment of my method.

In the manufacture of salt by the pan process, as well as in "grainers," which are largely used in Michigan and in western New York, the brine is more or less purified before evaporation and is supplied to the pan or "grainer," as the case may be, in just sufficient quantities to replace the water evaporated. The evaporation is then continued until the mother-liquors become so highly charged with calcium and magnesium chlorid that the resulting product is unmarketable. Even where the evaporation is not continued to a point where the impurities named are caused to crystallize out along with the salt, it being of course understood that the latter in a solution of ordinary concentration will deposit first, the methods of manufacture above described are objectionable unless the preliminary purification of the brine is quite thorough. This for the reason that the salt crystals as deposited, even though themselves pure, will carry with them a film of the liquor constituting the impure concentrate or mother-liquor and this upon drying leaves a thin coating upon the crystal of the hygroscopic deliquescent calcium salts. These cause the granules to cohere and in general depreciate the value of the product.

It is with a view to rendering easily possible the production of salt of a degree of purity such as will avoid the difficulty noted, that of attracting moisture, that the present process has been devised.

With this and other ends in view said invention then consists of the steps hereinafter fully described and particularly pointed out in the claims.

The annexed drawing and the following description set forth in detail one approved method of carrying out the invention, such disclosed mode, however, constituting but one of various ways in which the principle of the invention may be used.

In said annexed drawing: the single figure there appearing illustrates in more or less diagrammatic form a modification of an apparatus for the manufacture of salt by the "grainer" process, whereby the same is adapted for use in my improved method of producing crystals.

In said annexed drawing A, A', A² designate respectively, the members of a series of open "grainers," or evaporators. These, however, instead of being operated as individual evaporating pans, are connected by means of pipes $a$ so as to permit the flow of the brine being evaporated from one pan to the other in succession, such brine being admitted through an inlet pipe $a'$ and the final concentrate or mother-liquor being discharged through an outlet pipe $a^2$. The evaporation of the brine in each of the several "grainers" is effected by means of a steam coil $a^3$ in the usual fashion, the steam connections for such coils being omitted in the figure under consideration. In addition to such heating or evaporating apparatus each pan is provided with means for transferring the salt therefrom to the adjacent pan. To this end a corresponding side $a^4$ of each pan is inclined outwardly so as to approach more or less closely the adjacent wall $a^5$ of the neighboring pan and a sloping platform $a^6$ is provided leading from the end of such inclined wall of the first pan to the second pan. Passing around suitable rollers or sheaves $a^7$, as the case may be, is an endless conveyer $a^8$ preferably constructed of chains or cables bearing transverse bars constituting scrapers. By movement of such conveyers in the proper direction, the scrapers will serve to carry the salt formed in the first pan A up the inclined side $a^4$ of such pan and thence onto the sloping platform $a^6$ leading into the next pan. Upon its discharge thus into said second pan the salt is caught by the conveyer operating in this pan and slowly carried along by the same and then in turn elevated and discharged into the third pan A². This third pan forming in the apparatus illustrated the concluding member of the series, its conveyer is adapted to discharge the product therefrom into a transversely disposed trough A³ in which is provided a conveyer (not shown) for removing and depositing the salt in any suitable receptacle.

From the foregoing description it will accordingly be seen that the brine entering through inlet pipe $a'$ is passed in succession through the whole series of evaporating pans, the term pan being here employed in a general sense. In the first stage of evaporation of such brine, viz. in pan A² the solution will obviously be relatively pure; as it, however, passes into the intermediate pan A' and thence into the last pan A of the series, taken in this direction, it becomes more and more heavily charged with impurities owing to the increased concentration of the liquor. The crystals, however, that are formed from such most highly concentrated solution are removed by the conveyer operating in such pan and transferred to pan A', opportunity being afforded for the draining of the granular mass as it is carried up the inclined side of the pan by the conveyer. Upon its discharge into the second pan, as has been explained, such mass of salt is carried forward through the solution in that pan thus washing the crystals of any adhering film of the impure mother-liquor carried over from the first pan; and, at the same time, owing to the simultaneous evaporation of the solution in the second pan, an opportunity is provided for a further deposit of salt upon the crystals thus transferred and passing through such pan. This operation is again repeated upon the transfer of the crystals from this pan to the last of the series, any adhering solution from the second pan being washed as before and another opportunity for crystal growth afforded.

It is obviously immaterial whether or not evaporation in the successive pans be carried on at such a rate as to cause the formation of new crystals in additon to those passing through. The effect of the treatment in either event accorded such last named crystals will be to remove the film of adhering impurity and in place thereof to add an additional coat of the desired product or salt.

It has been stated that the apparatus shown and described herein is merely illustrative of the application of my improved process of forming crystals to the manufacture of one particular product and also to a more or less specific form of apparatus employed in such manufacture. It is not necessary to here enumerate other fields in which the process would find an opportunity for usefulness. Attention may be called, however, to the fact that the type of evaporator is quite immaterial since, as has already been indicated, not only can the ordinary pan be employed in place of the "grainers" shown but various types of vacuum apparatus may likewise be adapted for use in this process. The evaporation may be carried on slowly or vigorously as desired. The mechanical means used for passing the precipitated crystals through the pans in a direction from impure to less impure liquor may be of any desired form. Again the evaporators may be merged into one pan properly divided so as to present a series of compartments adapted to permit the crystal liquor to flow through them serially in one direction while the crystals are moved in a counter direction through the same series of comparments by suitable mechanical means.

Other modes of applying the principle of my invention may be employed instead of the ones explained, change being made as regards the process herein disclosed, provided the step or steps stated by any one of the following claims or the equivalents of such stated step or steps be employed.

I therefore particularly point out and distinctly claim as my invention:—

1. In a method of producing crystals from an impure solution, the steps which consist in washing crystals formed from such solution in another purer solution, and simultaneously evaporating such last named solution so as to permit a further production of such crystals.

2. The method of producing crystals from an impure solution, which consists in partially evaporating such solution in one pan, continuing such evaporation in a second pan, and simultaneously transferring the crystals formed in such second pan to the said first pan.

3. The method of producing crystals from an impure solution, which consists in passing such solution in succession through a series of evaporating pans, and simultaneously transferring the crystals from pan to pan of the series in a direction opposite to that in which the solution flows.

4. The method of producing crystals from an impure solution, which consists in evaporating such solution in successive stages, and transferring the crystals formed from the solution in a more highly impure stage to such solution in a less impure stage.

5. The method of producing crystals from an impure solution, which consists in evaporating such solution in successive stages, and transferring the crystals formed from the solution in its most highly impure stage in succession through the solution in stages of gradually decreasing concentration.

6. In a method of producing crystals from an impure solution, the steps which consist in conducting the evaporation in two or more successive stages, and mechanically moving the precipitated crystals through the said stages in a direction passing from a late stage of evaporation toward and through the earlier stages whereby the crystals formed in the later stages are washed in the purer liquor of earlier stages while evaporation is progressing therein.

7. The method of producing crystals from an impure solution, which consists in evaporating such solution in stages of successively greater impurity, and simultaneously continuously moving the crystals formed in any particular stage of the series, together with those previously added from a less pure stage, through such particular stage and into the next purer one.

8. The method of producing salt crystals from an impure brine, which consists in evaporating such brine in stages of successively greater impurity, and simultaneously continuously moving the crystals formed in any particular stage, together with those previously added from a less pure stage, through such particular stage and into the next purer one.

Signed by me this 31 day of October, 1907.

HERBERT H. DOW.

Attested by—
 Thos. Griswold, Jr.,
 C. A. Saunders.